United States Patent Office 3,793,246
Patented Feb. 19, 1974

3,793,246
PROCESS FOR PRODUCING AROMATIC POLYETHERS
Shinichi Izawa, Tokyo, Kazuhiko Harada, Kanagawa, and Ken Mizushiro and Miyoko Ishihara, Tokyo, Japan, assignors to Asahi-Dow Limited, Tokyo, Japan
No Drawing. Filed Dec. 17, 1971, Ser. No. 209,302
Claims priority, application Japan, Dec. 18, 1970, 45/113,058
Int. Cl. C08g 23/18
U.S. Cl. 260—47 ET
10 Claims

ABSTRACT OF THE DISCLOSURE

Aromatic polyethers having excellent thermal, mechanical and electrical properties are obtained by oxidative polymerization of 2,6-disubstituted phenols in the presence of a catalyst comprising a copper or manganese salt, a primary amine and at least one aliphatic, alicyclic or aromatic aldehyde.

FIELD OF THE INVENTION

This invention relates to an improved catalyst for use in the production of aromatic polyethers by oxidative polymerization of 2,6-disubstituted phenols.

More particularly, the invention pertains to a process for producing aromatic polyethers by subjecting 2,6-disubstituted phenols to oxidative polymerization in the presence of a catalyst comprising copper salts or manganese salts, a primary amine and at least one aldehyde.

Aromatic polyethers are plastics having excellent thermal, mechanical and electrical properties, as well as such desirable chemical properties as alkali resistance, acid resistance and hot water resistance.

BACKGROUND OF THE INVENTION

Several processes are known for the production of aromatic polyethers by the oxidative polymerization of 2,6-disubstituted phenols. These include, for example, processees utilizing oxidizing agents such as silver oxide, lead dioxide, potassium ferricyanide or ammonium persulfate, or processes utilizing catalysts such as a cuprous salt-tertiary amine complex, cupric salt-alkali-tertiary amine complex, cobalt chelate-transition metal complex or cobalt salt-tertiary amine complex. These prior art processes, however, produce appreciable quantities of diphenoquinone, as a by-product, and this colors molding products produced from the aromatic polyethers. In view of the fact that there are many patents concerning purification processes for removing of diphenoquinone from the polymers, it is apparent that overcoming the above-mentioned drawback is a subject matter of extensive study in this field. Further, the fact that the use of catalysts comprising copper salts and primary amines is not suitable for production of aromatic polyethers is disclosed in Japanese patent publication No. 18,692/61 and other patents.

SUMMARY OF THE INVENTION

An object of the present invention is to provide a novel catalyst for use in the production of aromatic polyethers from 2,6-disubstituted phenols.

Another object of the invention is to provide a process for producing aromatic polyethers from 2,6-disubstituted phenols in which diphenoquinone-forming side reactions are substantially inhibited.

A further object of the invention is to provide a process for producing aromatic polyethers which are high in purity and excellent in stability.

According to the present invention, 2,6-disubstituted phenols are polymerized in a medium in the presence of a catalyst comprising a primary amine, a copper salt or a manganese salt and an aldehyde. The catalyst of the present invention may additionally be utilized in association with an alkali. The incorporation of alkali results in improvements in the rate of reaction and the yield and viscosity of the product are increased.

The 2,6-disubstituted phenols employed in the present invention are phenols represented by the general formula,

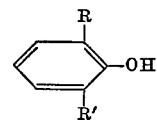

wherein R is a straight chain alkyl group of 1 to 4 carbon atoms; and R' is a halogen atom or alkyl group of 1 to 4 carbon atoms. Examples of the said phenols include 2,6-dimethylphenol,
2-methyl-6-ethylphenol,
2,6-diethylphenol,
2-methyl-6-n-propylphenol,
2-methyl-6-chlorophenol,
2-methyl-6-bromophenol,
2-methyl-6-isopropylphenol,
2-ethyl-6-n-propylphenol,
2-methyl-6-n-butylphenol,
2,6-di-n-propylphenol,
2-ethyl-6-chlorophenol,
2,6-di-n-butylphenol and
2-n-butyl-6-chlorophenol.

The liquid medium used in the oxidative polymerization of the present invention may be any liquid which is less susceptible to oxidation than the phenols to be oxidized and is not reactive with various radicals which are formed during the polymerization. Examples of such medium include aromatic hydrocarbons such as benzene, toluene, xylene, ethylbenzene and styrene; aliphatic hydrocarbons such as pentane, hexane, heptane, octane and cyclohexane; nitriles such as acetonitrile, propionitrile, benzonitrile and acrylonitrile; alcohols such as methanol, ethanol, propanol, benzyl alcohol and cyclohexanol; and halogenated hydrocarbons such as chloroform, dichloroethane, trichloroethane, chlorobenzene and dichlorobenzene. These may be used either alone or in the form of a mixture containing two or more liquids.

The copper salts used in the present invention are monovalent or divalent inorganic or organic copper salts. Examples of such salts include cuprous chloride, cupric chloride, cuprous bromide, cupric bromide, cuprous acetate, cupric acetate, cuprous benzoate, cupric benzoate, cuprous propionate, cupric propionate, cuprous butyrate, cupric butyrate, cuprous toluylate, cupric toluylate, cuprous palmitate, cupric palmitate, cuprous laurate, cuprous iodide, cuprous sulfate, cupric sulfate, cupric nitrate, cupric perchlorate, cuprous azide, cupric azide, cuprous sulfide, cupric sulfide, cuprous sulfite, cuprous cyanide and cuprous thiocyanide.

The manganese salts used in the present invention are divalent, trivalent or the like inorganic or organic manganese salts. Examples of such salts include manganese chloride (II), manganese sulfate (II), manganese bromide (II), manganese (II) acetylacetonate, manganese (III) acetylacetonate, manganese acetate (II), manganese propionate (II), manganese naphthenate (II), manganese sulfide (II), manganese oxalate (II), manganese nitrate (II) and manganese carbonate (II).

The primary amines used in the present invention are aliphatic, alicyclic, aromatic or polyvalent primary amines or a primary amine-containing amino acid. Examples of such aldehydes include methylamine, ethylamine, propylamine, isopropylamine, n-butylamine, tert-butylamine, amylamine, iso-amylamine, n-hexylamine, n-heptylamine, n-octylamine, isooctylamine, n-nonylamine, n-decylamine, n-pentadecylamine, cetylamine, allylamine, cyclopropylamine, cyclobutylamine, cyclopentylamine, cyclohexylamine, aniline, o-toluidine, m-toluidine, p-toluidine, benzylamine, $\alpha$-naphthylamine, $\beta$-naphthylamine, ethylenediamine, trimethylenediamine, tetramethylenediamine, cadaverine, hexamethylenediamine, 1,10 - diaminodecane, o-phenylenediamine, m-phenylenediamine, p-phenylenediamine, ethanolamine, $\beta$-hydroxy ethyl ethylenediamine, $\beta$-hydroxy propyl ethylenediamine, hydrazine, phenylhydrazine, hydroxylamine, 1,2,3 - triaminopropane, diethylene triamine, triethylenetetramine, glycine, alanine, histamine, cis - 1,2 - diaminocyclohexane, 2-methoxyethylamine, 2-mercaptoethylamine, di(2 - aminoethyl) ether and bis(2-aminoethyl) sulfide.

The aldehyde used in the present invention is an aliphatic, alicyclic or aromatic aldehyde. Examples of such aldehydes include formaldehyde, acetaldehyde, propionaldehyde, butyraldehyde isobutyraldehyde, valeraldehyde, isovaleraldehyde, pivalic aldehyde, caproic aldehyde, heptaldehyde, stearic aldehyde, glyoxal, succinic dialdehyde, acrolein, crotonic aldehyde, propiolaldehyde, cyclohexylaldehyde, glycolaldehyde, benzaldehyde, o-tolualdehyde, salicylaldehyde, m-hydroxybenzaldehyde, p-hydroxybenzaldehyde, cinnamaldehyde, $\alpha$-naphthaldehyde, $\beta$-naphthaldehyde, furfural, o-bromobenzaldehyde, m-bromobenzaldehyde, o-chlorobenzaldehyde, m-chlorobenzaldehyde, o-nitrobenzaldehyde, 2,4-dinitrobenzaldehyde, o-aminobenzaldehyde, m-aminobenzaldehyde, p-aminobenzaldehyde, benzaldehyde-m-sulfonic acid, p-methoxybenzaldehyde, paraformaldehyde and paraldehyde.

The alkaline reagents which may be employed in the present invention include all compounds which are not neutral among the compounds of metals of Groups Ia and IIa of the Mendeleeff's Periodic Table. Examples of such reagents include sodium carbonate, potassium carbonate, lithium bicarbonate, sodium hydroxide, potassium hydroxide, lithium hydroxide, magnesium phenoxide, sodium-n-butoxide, potassium methoxide and calcium acetate.

The catalysts of the present invention may be prepared by merely mixing either one of the copper salt or the manganese salt with the primary amine and the aldehyde. The mixing is preferably effected in the presence of the aforesaid medium, and of the alkali if it is used. The mode of mixing is not critical.

The amount of the copper salt or manganese salt used is in the range from 0.0001 to 0.1 mole, preferably from 0.001 to 0.05 mole, per mole of the 2,6-disubstituted phenol.

The amount of the primary amine used is at least equimolar to, preferably in the range from 2 to 60 times the number of moles of, the copper or manganese salt.

The amount of the aldehyde used is at least equimolar to, preferably in the range from 1.5 to 25 times the number of moles of, the copper salt or manganese salt.

The amount of the alkaline reagent, if used, is up to 0.5 mole, preferably up to 0.2 mole, per mole of the 2,6-disubstituted phenol.

Into the catalyst solution thus prepared, oxygen gas is previously flowed, and a solution of 2,6-disubstituted phenol in the aforesaid medium is charged. The medium used in this case may be identical with or different from the medium used at the time of preparation of the catalyst solution. The amount of the medium is in the range from 1 to 100 times, preferably from 2 to 20 times, the weight of the 2,6-disubstituted phenol.

The polymerization is carried out at a temperature between 0 and 100° C., preferably 20 to 70° C. The mode of polymerization is not critical.

The following non-limiting examples are given by way of illustration only. In the examples, all parts are by weight.

EXAMPLE 1

0.5 part of manganese chloride (II), 6 parts of n-butylamine, 4 parts of acetaldehyde and 0.1 part of sodium hydroxide were sufficiently stirred together with 40 parts of methanol, and oxygen gas was continuously flowed vigorously into the resulting mixture. To this mixture was added at one time a solution of 30 parts of 2,6-dimethylphenol in 80 parts of chloroform, and the mixture was subjected to oxidative polymerization with vigorous stirring. After continuing the reaction for 4 hours, a deposited white precipitate was recovered by filtration. Subsequently, the precipitate was washed with methanol containing a small amount of hydrochloric acid and with methanol in this order and then dried to obtain poly (2,6-dimethylphenylene-1,4-ether), yield 95%. The intrinsic viscosity of this polymer was 0.68 (measured in 0.5% chloroform at 25° C.; the same shall apply hereinafter). The amount of by-produced diphenoquinone in the polymer was 90 p.p.m. (quantitatively analyzed by use of a previously formed calibration curve and determined from the absorption at 420 m$\mu$. the same shall apply hereinafter).

The same reaction as above was effected, except that the acetaldehyde was not used, whereby the generation of heat was scarcely observed and no precipitate was formed. The reaction liquid was poured into a large amount of methanol containing a small amount of hydrochloric acid, whereby a small amount of a precipitate was formed. According to infrared spectral analysis, it was confirmed that the precipitate was poly (2,6-dimethylphenylene-1,4-ether). The yield of this polymer was 6%, and the intrinsic viscosity $\eta_{sp/c}$ thereof was 0.06.

EXAMPLE 2

1.1 parts of cupric sulfate, 4.0 parts of ethylenediamine and 8.0 parts of benzaldehyde were sufficiently stirred together with 100 parts of acetonitrile, and oxygen gas was continuously flowed vigorously into the resulting mixture. To this mixture were added at one time a solution of 50 parts of 2,6-dimethylphenol in 150 parts of orthodichlorobenzene, and the mixture was subjected to oxidative polymerization. When 1 hour had elapsed from initiation of the reaction, a white precipitate started to deposit. After continuing the reaction for 2 hours, the precipitate was recovered by filtration, and then washed and dried to obtain poly (2,6-dimethylphenylene-1,4-ether), yield 92%, $\eta_{sp/c}$ 0.44. The amount of diphenoquinone in the polymer was 110 p.p.m.

The same reaction as above was effected, except that the benzaldehyde was omitted with the result that no precipitate was formed. Even when the reaction liquid was poured into methanol containing hydrochloric acid, no deposition took place.

EXAMPLE 3

0.6 part of cupric acetate, 3.0 parts of cyclohexylamine, 2.0 parts of propionaldehyde and 0.5 parts of potassium phenoxide were dissolved in 120 parts of ethanol, and oxygen gas was continusly flowed into the resulting solution with vigorous stirring. To this solution was added a solution of 50 parts of 2,6-dimethylphenol in 150 parts of xylene, and the mixed solution was subjected to oxidative polymerization. After continuing the reaction for 3 hours, a deposited white precipitate was recovered by filtration, washed and then dried to obtain poly (2,6-dimethylphenylene-1,4-ether), yield 96%, $\eta_{sp/c}$ 0.41. The amount of a diphenoquinone in the polymer was 140 p.p.m.

EXAMPLE 4

0.4 part of manganese (II) acetylacetonate, 2.0 parts of orthotoluidine, 0.8 part of acetaldehyde and 0.2 part of sodium propoxide were dissolved in 50 parts of propanol, and oxygen gas was continuously flowed into the resulting mixture with vigorous stirring. To this solution was added a solution of 30 parts of 2,6-diethylphenyl in 60 parts of toluene, and the mixed solution was subjected to oxidative polymerization. After continuing the reaction for 4 hours, a deposited white precipitate was recovered by filtration, washed and then dried to obtain poly (2,6-diethylphenylene-1,4-ether), yield 93%, $\eta_{sp/c}$ 0.61. The amount of diphenoquinone in the polymer was 100 p.p.m.

EXAMPLE 5

0.5 part of cuprous chloride, 3.0 parts of di(2-aminoethyl) ether and 5.0 parts of orthochlorobenzaldehyde were dissolved in 100 parts of n-butanol, and oxygen gas was contiuuously flowed into the resulting solution with vigorous stirring. To this solution was added a solution of 30 parts of 2,6-diethylphenol in 150 parts of benzene, and the mixed solution was subjected to oxidative polymerization with stirring. After continuing the reaction for 2.5 hours, a deposited white precipitate was recovered by filtration, washed and then dried to obtain poly (2,6-diethylphenylene-1,4-ether), yield 96%, $\eta_{sp/c}$ 0.48. The amount of diphenoquinone in the polymer was 90 p.p.m.

EXAMPLE 6

0.8 part of manganese (II) acetate tetrahydrate was dissolved in a mixture of 18 parts of n-butanol and 6 parts of methanol, and then 0.4 part of ethanolamine and 0.3 part of paraldehyde were added thereto and stirred. 2.8 parts of potassium hydroxide were further added to effect complete solution. This solution was added to a solution of 20 g. of 2,6-dimethylphenol in 36 parts of toluene. The same procedure as Example 5 was applied to obtain poly(2,6-dimethylphenylene-1,4-ether), yield 93%, $\eta_{sp/c}$ 0.58. The amount of diphenoquinone in the polymer was 135 p.p.m.

EXAMPLE 7

Example 6 was repeated except that 0.5 part of cuprous chloride was used in place of the manganese (II) acetate tetrahydrate. Poly(2,6-dimethylphenylene-1,4-ether), was obtained in yield of 95%, $\eta_{sp/c}$ was 0.53. Diphenoquinone was contained in the polymer in an amount of 113 p.p.m.

EXAMPLE 8

Example 6 was repeated except that 0.8 part of cupric chloride was used in place of manganese (II) acetate tetrahydrate. There was obtained poly(2,6-dimethylphenylene-1,4-ether), yield 95%, $\eta_{sp/c}$ 0.58. The amount of diphenoquinone in the polymer was 105 p.p.m.

EXAMPLE 9

1.2 parts of cuprous chloride, 40 parts of pyridine and 40 parts of methanol were formed into a homogeneous solution, and oxygen gas was continuously flowed into the solution with vigorous stirring. To this solution was added at one time a solution of 30 parts of 2,6-dimethylphenol in 80 parts of benzene, and the mixed solution was subjected to oxidative polymerization. When the reaction was continued for 3 hours, there were formed in the reaction liquid a pale yellow polymer precipitate and red diphenoquinone particles. The precipitate and diphenoquinone particles were recovered by filtration, washed and then dried to obtain a solid, yield 92%, $\eta_{sp/c}$ 0.59. The amount of the diphenoquinone in the solid was 53,000 p.p.m.

What is claimed is:

1. A process for producing aromatic polyethers which comprises contacting a 2,6-disubstituted phenol selected from the group consisting of 2,6-dimethylphenol, 2-methyl-6-ethylphenol, 2,6-diethylphenol, 2-methyl-6-n-propylphenol, 2-methyl-6-chlorophenol, 2-methyl-6-bromophenol, 2-methyl-6-isopropylphenol, 2 - ethyl-6-n-propylphenol, 2-methyl-6-n-butylphenol, 2,6-di-n-propylphenol, 2-ethyl-6-chlorophenol, 2,6-di-n-butylphenol, and 2-n-butyl-6-chlorophenol with a molecular oxygen containing gas at 0° to 100° C. in a solvent in the presence of a catalyst comprising a copper or manganese salt, a primary amine and an aldehyde, the amount of said copper or manganese salt being 0.0001 to 0.1 mole per mole of the phenol, the amount of said primary amine and of said aldehyde being, each, at least equimolar to the copper or manganese salt.

2. A process according to claim 1, wherein the amount of the copper salt or manganese salt is 0.001 to 0.05 mole per number of moles of the phenol, the amount of the primary amine is 2 to 60 times the mole of the copper or manganese salt, and the amount of the aldehyde is 1.5 to 2.5 times the number of moles of the copper or manganese salt.

3. A process according to claim 1, wherein the catalyst additionally contains up to 0.5 mole of an alkaline reagent selected from the group consisting of sodium carbonate, potassium carbonate, lithium bicarbonate, sodium hydroxide, potassium hydroxide, lithium hydroxide, magnesium phenoxide, sodium-n-butoxide, potassium methoxide and calcium acetate per mole of 2,6-disubstituted phenol.

4. A process according to claim 3, wherein the catalyst additionally contains up to 0.2 mole of alkaline reagent per mole of 2,6-disubstituted phenol.

5. A process according to claim 1, wherein the copper salt is one member selected from the group consisting of cuprous chloride, cupric chloride, cuprous bromide, cupric bromide, cuprous acetate, cupric acetate, cuprous benzoate, cupric benzoate, cuprous propionate, cupric propionate, cuprous butyrate, cupric butyrate, cuprous toluylate, cupric toluylate, cuprous palmitate, cupric palmitate, cuprous laurate, cuprous iodide, cuprous sulfate, cupric sulfate, cupric nitrate, cupric perchlorate, cuprous azide, cupric azide, cuprous sulfide, cupric sulfide, cuprous sulfite, cuprous cyanide and cuprous thiocyanide.

6. A process according to claim 1, wherein the manganese salt is one member selected from the group consisting of manganese chloride (II), manganese sulfate (II), manganese bromide (II), manganese (II) acetylacetonate, manganese (III) acetylacetonate, manganese acetate (II), manganese propionate (II), manganese naphthenate (II), manganese sulfide (II), manganese oxalate (II), manganese nitrate (II), and manganese carbonate (II).

7. A process according to claim 1, wherein the primary amine is one member selected from the group consisting of methylamine, ethylamine, propylamine, isopropylamine, n-butylamine, tert-butylamine, amylamine, isoamylamine, n-hexylamine, n-heptylamine, n-octylamine, isooctylamine, n-nonylamine, n-decylamine, n-pentadecylamine, cetylamine, allylamine, cyclopropylamine, cyclobutylamine, cyclopentylamine, cyclohexylamine, aniline, o-toluidine, m-toluidine, p-toluidine, benzylamine, α-naphthylamine, β-naphthylamine, ethylenediamine, trimethylenediamine, tetramethylenediamine, cadaverine, hexamethylenediamine, 1,10-diaminodecane, o-phenylenediamine, m-phenylenediamine, p-phenylenediamine, ethanolamine, β-hydroxyethyl ethylenediamine, β-hydroxypropyl, ethylenediamine, hydrazine, phenylhydrazine, hydroxylamine, 1,2,3-triaminopropane, diethylenetriamine, triethylenetetramine, glycine, alanine, histamine, cis-1,2-diaminocyclohexane, 2-methoxyethylamine, 2-mercaptoethylamine, di(2-aminoethyl) ether and bis(2-aminoethyl) sulfide.

8. A process according to claim 1 wherein the aldehyde is one member selected from the group consisting of formaldehyde, acetaldehyde, propionaldehyde, butyraldehyde, isobutyraldehyde, valeraldehyde, isovaleraldehyde, pivalic aldehyde, caproic aldehyde, heptaldehyde, stearic aldehyde, glyoxal, succinic dialdehyde, acrolein, crotonic aldehyde, propiolaldehyde, cyclohexylaldehyde, glycolaldehyde, benzaldehyde, o-tolualdehyde, salicylaldehyde, m-hydroxybenzaldehyde, p-hydroxybenzaldehyde, cinnamic aldehyde, α-naphthaldehyde, β-naphthaldehyde, furfural, o-bromobenzaldehyde, m-bromobenzaldehyde, o-chlorobenzaldehyde, m-chlorobenzaldehyde, o-nitrobenzaldehyde, 2,4-dinitrobenzaldehyde, o-aminobenzaldehyde, m-aminobenzaldehyde, p-aminobenzaldehyde, benzaldehyde-m-sulfonic acid, p-methoxybenzaldehyde, paraformaldehyde and paraldehyde.

9. A process according to claim 1, wherein the amount of solvent is 1 to 100 times the weight of 2,6-disubstituted phenol.

10. A process according to claim 1, wherein the reaction temperature is in the range from 20° to 70° C.

References Cited

UNITED STATES PATENTS 3,306,875   2/1967   Hay ................ 260—47

MELVIN GOLDSTEIN, Primary Examiner